United States Patent
Barkan et al.

(10) Patent No.: US 8,910,872 B2
(45) Date of Patent: Dec. 16, 2014

(54) IMAGING READER AND METHOD WITH DUAL FUNCTION ILLUMINATION LIGHT ASSEMBLY

(75) Inventors: Edward Barkan, Miller Place, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 388 days.

(21) Appl. No.: 12/380,440

(22) Filed: Feb. 27, 2009

(65) Prior Publication Data

US 2010/0219249 A1   Sep. 2, 2010

(51) Int. Cl.
*G06K 7/10* (2006.01)

(52) U.S. Cl.
CPC ........ *G06K 7/10732* (2013.01); *G06K 7/10831* (2013.01); *G06K 2207/1011* (2013.01)
USPC ................................. 235/462.42; 235/462.43

(58) Field of Classification Search
USPC ................. 235/462.4, 462.2, 462.32, 462.42, 235/462.43
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,262,628 A * | 11/1993 | Shepard et al. | 235/462.36 |
| 5,304,786 A | 4/1994 | Pavlidis et al. | |
| 5,637,854 A * | 6/1997 | Thomas | 235/462.14 |
| 5,703,349 A | 12/1997 | Meyerson et al. | |
| 6,340,114 B1 | 1/2002 | Correa et al. | |
| 6,601,768 B2 | 8/2003 | McCall et al. | |
| 7,017,817 B2 | 3/2006 | Ito et al. | |
| 2002/0139853 A1 * | 10/2002 | Tsikos et al. | 235/462.01 |
| 2003/0019934 A1 | 1/2003 | Hunter et al. | |
| 2005/0103854 A1 * | 5/2005 | Zhu et al. | 235/462.22 |
| 2007/0152055 A1 | 7/2007 | Barber et al. | |
| 2007/0285698 A1 * | 12/2007 | Wang et al. | 358/1.13 |
| 2008/0239509 A1 | 10/2008 | Vinogradov | |
| 2008/0265035 A1 | 10/2008 | Vinogradov et al. | |
| 2008/0290171 A1 | 11/2008 | Vinogradov | |
| 2010/0219248 A1 | 9/2010 | Barkan et al. | |

FOREIGN PATENT DOCUMENTS

CN   1441379 A   9/2003

OTHER PUBLICATIONS

International Search Report and Written Opinion for International Patent Application No. PCT/US2010/024225 mailed on May 11, 2010.

(Continued)

*Primary Examiner* — Michael G Lee
*Assistant Examiner* — Tabitha Chedekel
(74) *Attorney, Agent, or Firm* — Nong-Qiang Fan (57) ABSTRACT

An imaging reader for, and a method of, imaging targets, include a solid-state imager supported by a housing for capturing return light from a target over a field of view. An illumination light assembly performs both illumination and aiming functions. Illumination light is projected along an optical path through a passage in the housing to illuminate the target. The housing has boundary walls spaced along the optical path away from the imager and the illumination light assembly for clipping the illumination light projected through the passage to form on the target an aiming light distribution that visually indicates a periphery of the field of view to assist in positioning the target entirely within the field of view.

21 Claims, 5 Drawing Sheets

(56) References Cited

OTHER PUBLICATIONS

International Preliminary Report on Patentability and Written Opinion for International Patent Application No. PCT/US2010/024225 mailed on Sep. 9, 2011.
Non Final Office Action mailed on Jan. 18, 2011 in U.S. Appl. No. 12/380,434, Edward Barkan, filed Feb. 27, 2009.
Final Office Action mailed on Jul. 22, 2011 in U.S. Appl. No. 12/380,434, Edward Barkan, filed Feb. 27, 2009.
Notice of Allowance mailed on May 25, 2012 in European Patent Application No. 10725305.6.
International Preliminary Report on Patentability and Written Opinion for International Patent Application No. PCT/US2010/024245 mailed Sep. 9, 2011.
International Search Report and Written Opinion dated Aug. 12, 2010 in related case PCT/US2010/024245.
Chinese Office Action mailed Jun. 28, 2013 in related counterpart Patent Appliction No. 201080009587.2.
Chinese Office Action mailed Jul. 31, 2013 in counterpart Patent Application No. 201080009583.4.
Chinese Notice of Allowance mailed Dec. 31, 2013 in related counterpart Patent Application No. 201080009587.2.
First Examiner's Report mailed Sep. 30, 2013 in related counterpart European Patent Application No. 10707718.2, Edward Barkan, filed Feb. 27, 2009.
Non Final Office Action mailed Jun. 11, 2013 in related U.S. Appl. No. 12/380,434, Edward Barkan, filed Feb. 27, 2009.
Notice of Allowance Oct. 29, 2013 in related U.S. Appl. No. 12/380,434, Edward Barkan, filed Feb. 27, 2009.
Chinese Notification for Patent Registration issued on Mar. 4, 2014 in counterpart Patent Application No. 201080009583.4.

* cited by examiner

IMAGING READER AND METHOD WITH DUAL FUNCTION ILLUMINATION LIGHT ASSEMBLY

DESCRIPTION OF THE RELATED ART

Solid-state imaging systems or imaging readers have been used, in both handheld and hands-free modes of operation, to capture images from diverse targets, such as symbols to be electro-optically decoded and read and/or non-symbols to be processed for storage and display. Symbols include one-dimensional bar code symbols, particularly of the Universal Product Code (UPC) symbology, each having a linear row of bars and spaces spaced apart along a scan direction, as well as two-dimensional symbols, such as Code 49, a symbology that introduced the concept of vertically stacking a plurality of rows of bar and space patterns in a single symbol, as described in U.S. Pat. No. 4,794,239. Another two-dimensional code symbology for increasing the amount of data that can be represented or stored on a given amount of surface area is known as PDF417 and is described in U.S. Pat. No. 5,304,786. Non-symbol targets can include any person, place or thing, e.g., a signature, whose image is desired to be captured by the imaging reader.

The imaging reader includes a solid-state imager having an array of photocells or light sensors that correspond to image elements or pixels in a two-dimensional field of view of the imager, an illumination light assembly for uniformly illuminating the target with illumination light, and an imaging lens assembly for capturing return illumination and/or ambient light scattered and/or reflected from the target being imaged, and for focusing the return light onto the sensor array to initiate capture of an image of the target as pixel data.

The imager may be a one- or two-dimensional charge coupled device (CCD) or a complementary metal oxide semiconductor (CMOS) device, and includes associated circuits for converting the pixel data into electrical signals corresponding to a one- or two-dimensional array of the pixel data over the field of view. The imager is analogous to the imager used in an electronic digital camera.

The imager captures the return light under the control of a controller or programmed microprocessor that is operative for processing the electrical signals from the imager. When the target is a symbol, the controller is operative for processing and decoding the electrical signals into decoded information indicative of the symbol being imaged and read. When the target is a non-symbol, the controller is operative for processing the electrical signals into a processed image of the target, including, among other things, de-skewing the captured image, re-sampling the captured image to be of a desired size, enhancing the quality of the captured image, compressing the captured image, and transmitting the processed image to a local memory or a remote host.

It is therefore known to use the imager for capturing a monochrome image of a target symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

Yet, the use of the known imaging reader, especially a handheld movable reader, for imaging targets located anywhere within a range of working distances relative to the reader, has proven to be challenging. An operator cannot see exactly whether a target is located entirely within the field of view of the array during reading, or know whether the target is optimally centrally located within the field of view. It is not uncommon for the operator to repeatedly move the portable reader in multiple side-to-side, up-and-down, and back-and-forth, directions and repeatedly aim the portable reader at a single target several times before an indicator advises the operator that the target has been successfully imaged, thereby slowing down transaction processing and reducing productivity.

This blind aiming at the target is easier if the target is relatively small or is far away from the reader, because then the chances that the target will lay within the field of view are greater. However, in most cases, this blind aiming at the target is difficult to overcome, especially when the position and orientation of the target are variable.

To help overcome this blind aiming problem, an aiming light assembly is typically mounted in the reader, for projecting a visible aiming light pattern, for example, a generally circular spot or cross-hairs for placement at the center of the symbol, or framing lines to bound the field of view, to assist the operator in visually locating the target within the field of view and, thus, advise the operator in which direction the reader is to be moved in order to position the aiming light pattern on the target prior to reading. The aiming light assembly includes at least one light source, such as a laser, a focusing lens, and a pattern shaping optical element, such as a diffractive optical element (DOE), or a refractive optical element (ROE). The focused light passing through a respective DOE forms multiple diverging beamlets, as described in U.S. Pat. No. 6,340,114, which project continuous lines or rows of spots arrayed in the aiming light pattern on the target to indicate the field of view of the imager.

As advantageous as such known aiming light assemblies are, they have proven to be less than satisfactory in certain situations. For example, the known aiming light assembly is expensive not only in terms of component cost, but also in the labor cost of assembling and aligning its various optical components. The aiming light assembly adds non-negligible weight and size to the reader, which is undesirable for the reader whose size and weight are required to be low. Also, the reader is often a subsidiary system in an electrical apparatus, such as a price checker in a retail store, an airport gate check-in kiosk, a lottery machine, etc., that performs other functions, and hence, the reader must be as light in weight and as compact as possible.

SUMMARY OF THE INVENTION

One feature of the present invention resides, briefly stated, in an imaging reader for, and a method of, imaging targets. The reader includes a solid-state imager supported by the reader and having an array of image sensors for capturing return light from a target over a field of view, and for generating electrical signals indicative of the captured light corresponding to the target. Preferably, the imager is a CCD, a CMOS chip, or a wafer scale CCD, with a rolling or a global shutter. The imager may be an area or two-dimensional array having mutually orthogonal multiple rows and columns. The target may be a symbol having a plurality of elements of different light reflectivity, e.g., bars and spaces, and arranged in various symbologies. The target may be a non-symbol target, such as any person, place or thing whose image is desired to be captured by the imaging reader. A controller or programmed microprocessor processes the electrical signals into data indicative of the target being imaged.

The reader is configured with a housing having boundary walls bounding a passage. A light-transmissive window is advantageously mounted in the passage and is bounded by the boundary walls. The housing may be gun-shaped with a handle for handheld operation, and a body having a front end region in which the boundary walls are located, or the housing may be box-shaped and configured to be picked up for handheld operation and/or supported on a countertop for hands-free operation.

In accordance with an aspect of this invention, an illumination light assembly is supported by the housing and is operatively connected to the controller. The illumination light assembly performs two functions: illumination and aiming. The illumination light assembly projects illumination light along an optical path through the passage to illuminate the target. The boundary walls are spaced along the optical path away from the imager and the illumination light assembly for a distance greater than in the prior art and, therefore, clip the illumination light projected through the passage to form on the target an aiming light distribution that visually indicates a periphery of the field of view to assist in positioning the target entirely within the field of view. In the prior art, the illumination light assembly is located up front close to the window so that the illumination light is not clipped. By recessing the imager and the illumination light assembly further back into the housing away from the window, as considered along the optical path, the boundary walls clip the illumination light. Preferably, the boundary walls are circumferentially complete, and circumferentially clip the illumination light to visually indicate the entire periphery of the field of view. As a consequence, the operator will see a fairly sharp cut-off of the illumination light on the target.

Thus, a separate aiming light assembly, as taught by the prior art, has been eliminated, together with the associated expense of component cost and labor cost of assembling and aligning its various optical components, such as lasers, DOEs and ROEs. The elimination of a separate aiming light assembly reduces the weight and size of the reader, thereby rendering it very light in weight and compact, and particularly desirable for inclusion as a subsidiary system in an electrical apparatus, such as a price checker in a retail store, an airport gate check-in kiosk, a lottery machine, etc., that performs other functions.

In a preferred embodiment, the illumination light assembly includes at least one illumination light emitting diode (LED), and preferably a pair of illumination LEDs spaced apart from each other, and a pair of illumination lenses, one for each illumination LED, for optically modifying the illumination light as a pair of conical light beams that at least partially overlap on the target. Parallax from the two illumination LEDs will prevent the aforementioned cut-off from being perfect, but there will be a visible degradation in the intensity of the illumination light beyond the periphery of the field of view, which is sufficient to indicate where the field of view ends and to enable the operator to avoid positioning the target even partially outside the field of view. The illumination LEDs and the imager are commonly mounted on a printed circuit board, and the pair of illumination LEDs are preferably located at opposite sides of the imager.

The illumination light assembly could include an aiming LED for emitting an aiming light beam, and an aiming lens for optically modifying the aiming light beam to project an aiming spot centrally on the target. The aiming LED and the imager are commonly mounted on the printed circuit board, and the aiming LED is preferably located midway between the illumination LEDs. The aiming beam can also be used to wake up the reader after it has entered a sleep mode in which the illumination LEDs are turned off, but the aiming LED is turned on, and the imager is used to detect when the target is positioned in the aiming beam. In response to such detection, the controller turns the illumination LEDs 12A, 12B on, and target imaging resumes. The aiming beam provides sufficient light to wake up the reader even in dark, ambient environments.

Another feature of the present invention resides in a method of imaging targets with an imaging reader. The method is performed by bounding a passage with boundary walls of a housing, capturing return light from a target along an optical path through the passage over a field of view of a solid-state imager, generating an electrical signal indicative of the captured light, processing the electrical signal into data indicative of the target being imaged, projecting illumination light from an illumination light assembly along the optical path through the passage to illuminate the target, spacing the boundary walls along the optical path away from the imager and the illumination light assembly, and clipping the illumination light projected through the passage to form on the target an aiming light distribution that visually indicates a periphery of the field of view to assist in positioning the target entirely within the field of view.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
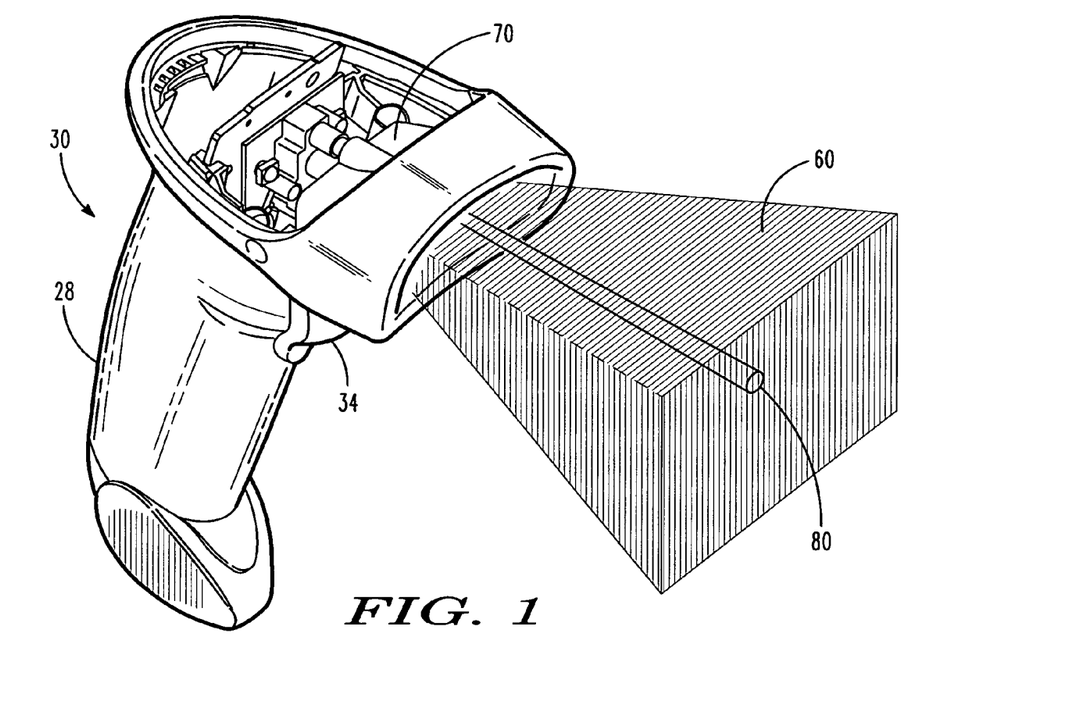
FIG. 1 is a broken-away, overhead, perspective view of a portable imaging reader operative in a handheld mode for projecting light that both illuminates, and assists in aiming the reader at, a target, according to this invention.
Figures 5, 6:
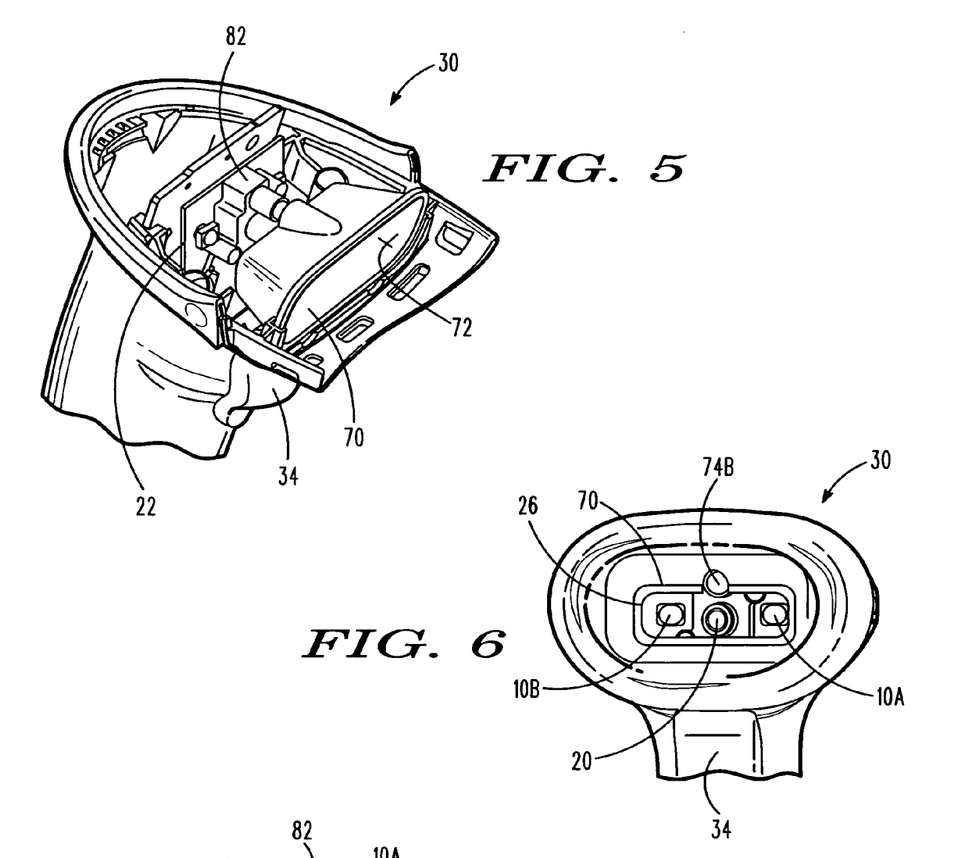
FIG. 5 is an enlarged, broken-away, overhead, perspective view of the portable imaging reader of FIG. 1.
FIG. 6 is a broken-away, front elevational view of the portable imaging reader of FIG. 1.
Figure 8:
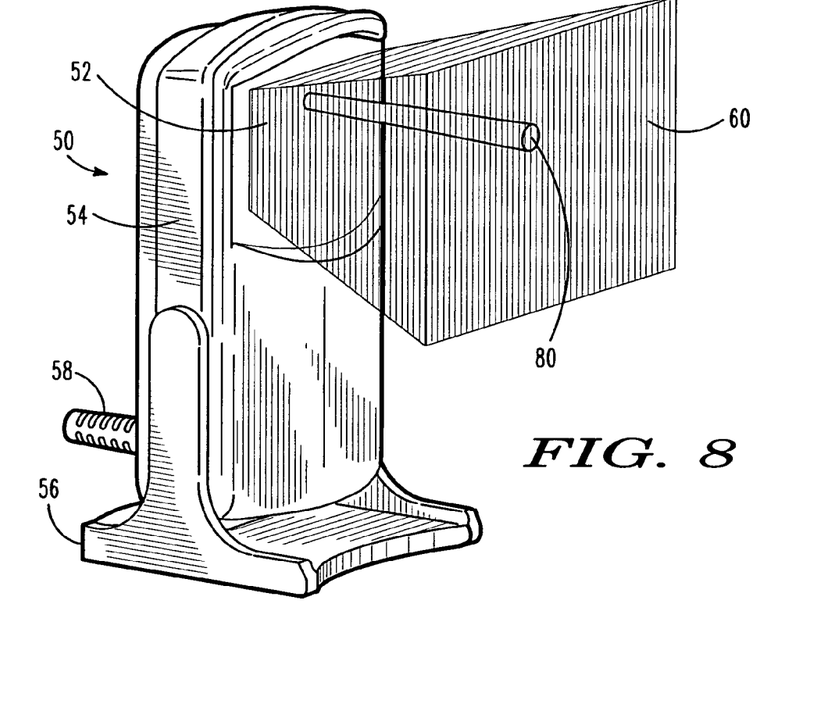
FIG. 8 is a perspective view of an imaging reader operative in a hands-free mode for projecting light that both illuminates, and assists in aiming the reader at, a target, according to this invention.

Reference numeral 30 in FIG. 1 generally identifies a portable, handheld imaging reader having a gun-shaped housing 28 and a light-transmissive window 26 (see FIG. 6) aimable at a target to be imaged. A trigger 34 is manually depressed by an operator to initiate imaging of targets, especially one- or two-dimensional symbols, and/or non-symbols, located at, or at a distance from, the window 26. Reference numeral 50 in FIG. 8 generally identifies a hands-free imaging reader having a light-transmissive window 52 and a box-shaped housing 54 supported by a base 56 for supporting the imaging reader 50 on a countertop or like support surface. The imaging reader 50 can thus be used as a stationary workstation in which targets are slid, swiped past, or presented to, the window 52, or can be picked up from the countertop and used as a handheld reader. Housings of other configurations can be employed. A data/power cable 58, as illustrated in FIG. 8, is connected to the reader 50, but can also be omitted, in which case, the reader 50 communicates with a remote host by a wireless link, and the reader 50 is electrically powered by an on-board battery.

Figure 2:
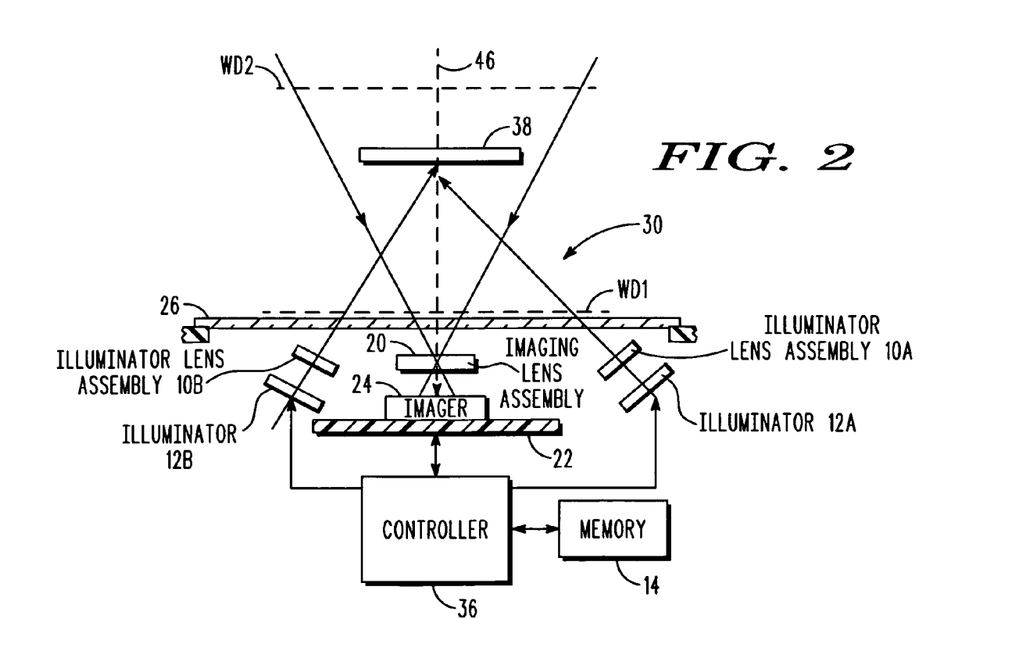
FIG. 2 is a schematic diagram of various components of the reader of FIG. 1 in accordance with this invention.

As schematically shown in FIG. 2, an imager 24 is mounted on a printed circuit board (PCB) 22 in each reader. The imager 24 is a solid-state device, for example, a CCD, a CMOS, or a wafer scale CCD, having a one-dimensional array of addressable image sensors or pixels arranged in an area or a two-dimensional array of such sensors arranged in mutually orthogonal rows and columns, and operative for detecting return light captured by an imaging lens assembly 20 along an optical path or axis 46 through the window 26, 52. The return light is scattered and/or reflected from a target 38 as pixel data over a two-dimensional field of view. The imager 24 includes electrical circuitry, for example, an analog to digital converter, for converting the pixel data to electrical signals representing numbers indicative of the grey scale of each pixel. The imaging lens assembly 20 is operative for focusing the return light onto the array of image sensors to enable the target 38 to be read. The target 38 may be located anywhere in a working range of distances between a close-in working distance (WD1) and a far-out working distance (WD2). In a preferred embodiment, WD1 is about four to six inches from the imager 24, and WD2 can be many feet from the window 26, 52, for example, around fifty feet away.

Figure 3:
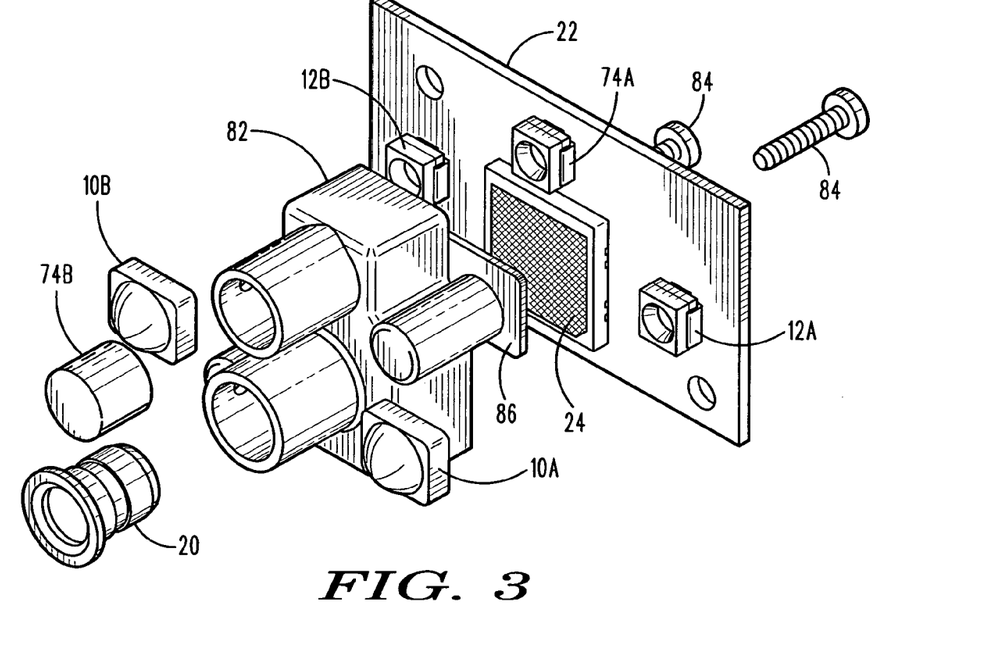
FIG. 3 is an exploded perspective view of an illumination light assembly for use in the reader of FIG. 1.
Figure 7:
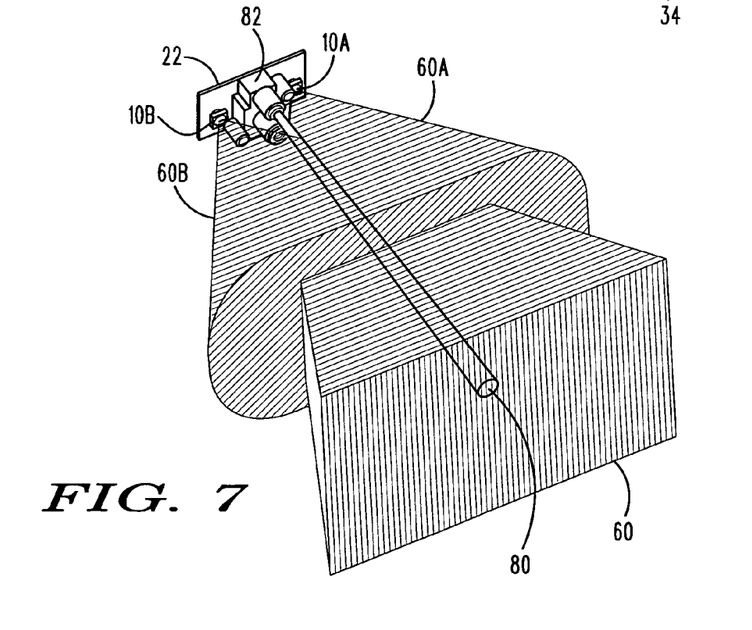
FIG. 7 is a diagrammatic perspective view of the illumination light assembly of FIG. 4 and depicting the clipped illumination light projected therefrom.

In accordance with this invention, an illumination light assembly is also mounted in each imaging reader and preferably includes an illuminator or illuminating light source 12, e.g., a pair of light emitting diodes (LEDs) 12A, 12B (see FIGS. 3-4) spaced apart from each other and surface-mounted on the PCB 22, and an illuminator lens assembly 10, e.g., a pair of illuminating lenses 10A, 10B (see FIGS. 3-4), each preferably, but not necessarily, mounted on a respective illumination LED 12A, 12B, for optically modifying the illumination light emitted from the illumination LEDs 12A, 12B to form, as shown in FIG. 7, a pair of conical light beams 60A, 60B that at least partially overlap on the target 38 to uniformly illuminate the target 38 with the illuminating light. The illumination LEDs 12A, 12B and the illuminating lenses 10A, 10B are schematically shown as being inclined or tilted relative to the window 26 in FIG. 2, only for purposes of illustration. In practice, the illumination LEDs 12A, 12B and the illuminating lenses 10A, 10B are arranged as shown in the other figures, and are preferably symmetrically located at opposite sides of the imager 24. The LEDs 12A, 12B are preferably pulsed for an exposure time period, but can be energized continuously.

As shown in FIG. 2, the illumination LEDs 12A, 12B are operatively connected to a controller or programmed microprocessor 36 operative for controlling the operation of these components. The imager 24 is also operatively connected to the controller 36. A local memory 14 is accessible by the controller 36 for storing and retrieving data.

In operation, the controller 36 sends a command signal to pulse the illumination LEDs 12A, 12B for the exposure time period, say 500 microseconds or less, and energizes and exposes the imager 24 to collect the return light, e.g., illumination light and/or ambient light, from the target 38 during the exposure time period. A typical array having a rolling shutter needs about 16-33 milliseconds to acquire the entire target image and operates at a frame rate of about 30-60 frames per second. A global shutter is currently preferred. Since the illumination LEDs 12A, 12B are only energized for a brief exposure time period, they can be driven at drive currents higher than heretofore. This allows the exposure time period to be as short as possible, and improves swipe speed tolerance, as well as increasing the performance and lowering the overall cost.

In accordance with an aspect of this invention, the illumination light assembly performs two functions: illumination and aiming. In the prior art, as noted above, the illumination light assembly only performed the illumination function, and a separate aiming light assembly performed the aiming function, i.e., to help the operator accurately aim the reader at the target 38.

To achieve aiming without using a separate aiming light assembly, the housing 28, 54 of each reader is configured with boundary walls, such as a bezel 70 (see FIG. 5), bounding a passage 72. The light-transmissive window 26, 52 is advantageously mounted in the passage 72 and is bounded by the bezel 70. The bezel 70 is spaced along the optical path 46 away from the imager 24 and the illumination LEDs 12A, 12B.

In operation, the illumination light assembly projects the illumination light comprised of beams 60A, 60B along the optical path 46 through the passage 72 to illuminate the target 38. At the same time, the illumination light projected through the passage 72 is clipped by the bezel 70 to form on the target 38 an aiming light distribution 60 that visually indicates a periphery of the field of view of the imager 24 to assist in positioning the target 38 entirely within the field of view. In the prior art, the illumination light assembly is located up front close to the window so that the illumination light is not clipped. By recessing the imager 24 and the illumination light assembly further back into the housing away from the window, as considered along the optical path, the bezel 70 clips the illumination light. Preferably, the bezel 70 is circumferentially complete, and circumferentially clips the aiming light distribution 60 to visually indicate the entire periphery of the field of view. As a consequence, the operator will see a fairly sharp cut-off of the illumination light on the target 38. Parallax from the two illumination LEDs 12A, 12B will prevent the cut-off from being perfect, but there will be a visible degradation in the intensity of the illumination light beyond the periphery of the field of view, which is sufficient to indicate where the field of view ends and to enable the operator to avoid positioning the target even partially outside the field of view.

Thus, a separate aiming light assembly, as taught by the prior art, has been eliminated, together with the associated expense of component cost and labor cost of assembling and aligning its various optical components, such as lasers, DOEs and ROEs. The elimination of a separate aiming light assembly reduces the weight and size of the reader, thereby rendering it very light in weight and compact, and particularly desirable for inclusion as a subsidiary system in an electrical apparatus, such as a price checker in a retail store, an airport gate check-in kiosk, a lottery machine, etc., that performs other functions.

Optionally, the illumination light assembly could include an aiming LED 74A for emitting an aiming light beam, and an aiming lens 74B for optically modifying the aiming light beam to project an aiming spot 80 centrally on the target 38.

The aiming LED 74A and the imager 24 are commonly surface-mounted on the PCB 22, and the aiming LED 74A is preferably located midway between the illumination LEDs 12A, 12B. The aiming beam can also be used to wake up the reader after it has entered a sleep mode in which the illumination LEDs 12A, 12B are turned off, but the aiming LED 74A is turned on, and the imager 24 is used to detect when the target 38 is positioned in the aiming beam. In response to such detection, the controller 36 turns the illumination LEDs 12A, 12B on, and target imaging resumes. The aiming beam provides sufficient light to wake up the reader even in dark, ambient environments.

Figure 4:
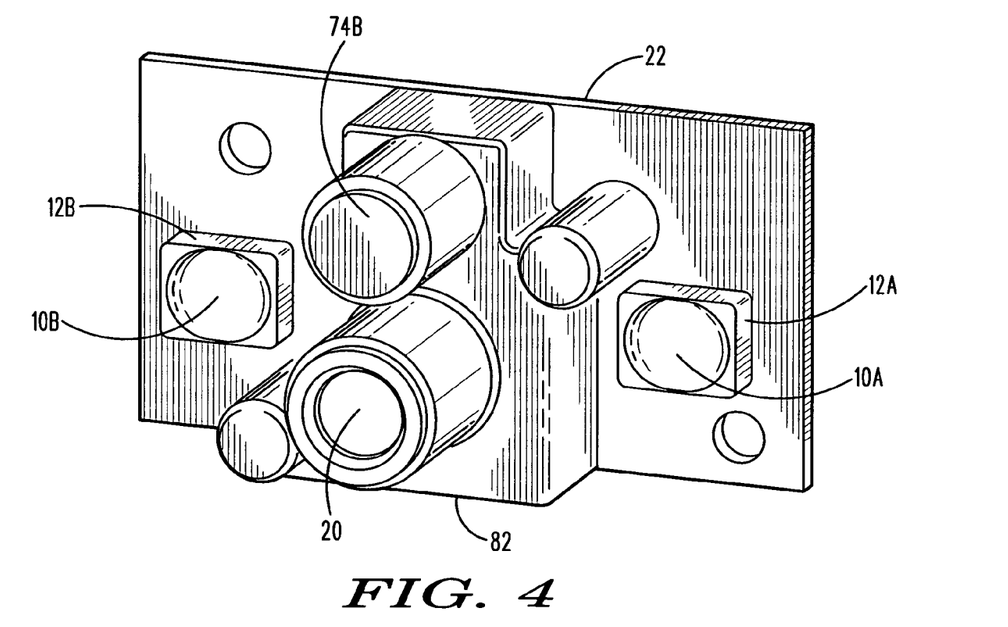
FIG. 4 is an assembled perspective view of the illumination light assembly of FIG. 3.

A chassis 82 overlies the PCB 22 and is connected thereto by a pair of fasteners 84. The chassis holds the imaging lens 20 and the aiming lens 74B, and encloses the imager 24. A cover glass 84 overlies and protects the imager 24. All of the assembled components in FIG. 4 are known as a scan or imaging engine.

Figure 9:
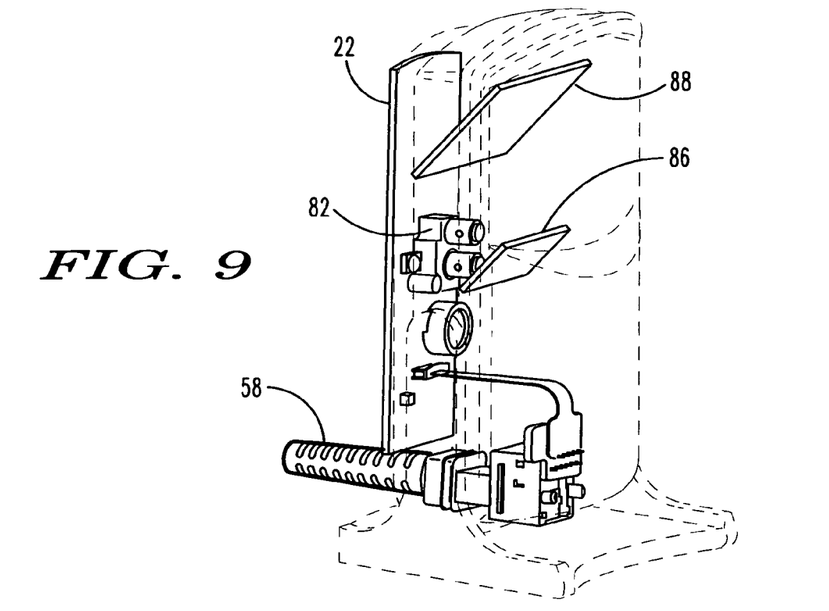
FIG. 9 is a perspective view of the interior of the imaging reader of FIG. 8.

In FIGS. 1-7, the imaging engine is mounted at about the same elevation as the bezel 70. In FIG. 9, the imaging engine is mounted below the bezel (not illustrated). A pair of stacked fold mirrors 86, 88 twice folds the optical path along which the illumination light 60 and/or the aiming spot 80 travel. In the prior art, the illumination light assembly is located up front close to the window so that the illumination light is not clipped. By positioning the imager 24 and the illumination light assembly further back into the housing away from the window 52, as considered along the optical path, the bezel 70 clips the illumination light. The use of two fold mirrors 86, 88 is one way to increase the distance between the illumination light assembly and the bezel 70 without increasing the depth of the housing.

Figure 10:
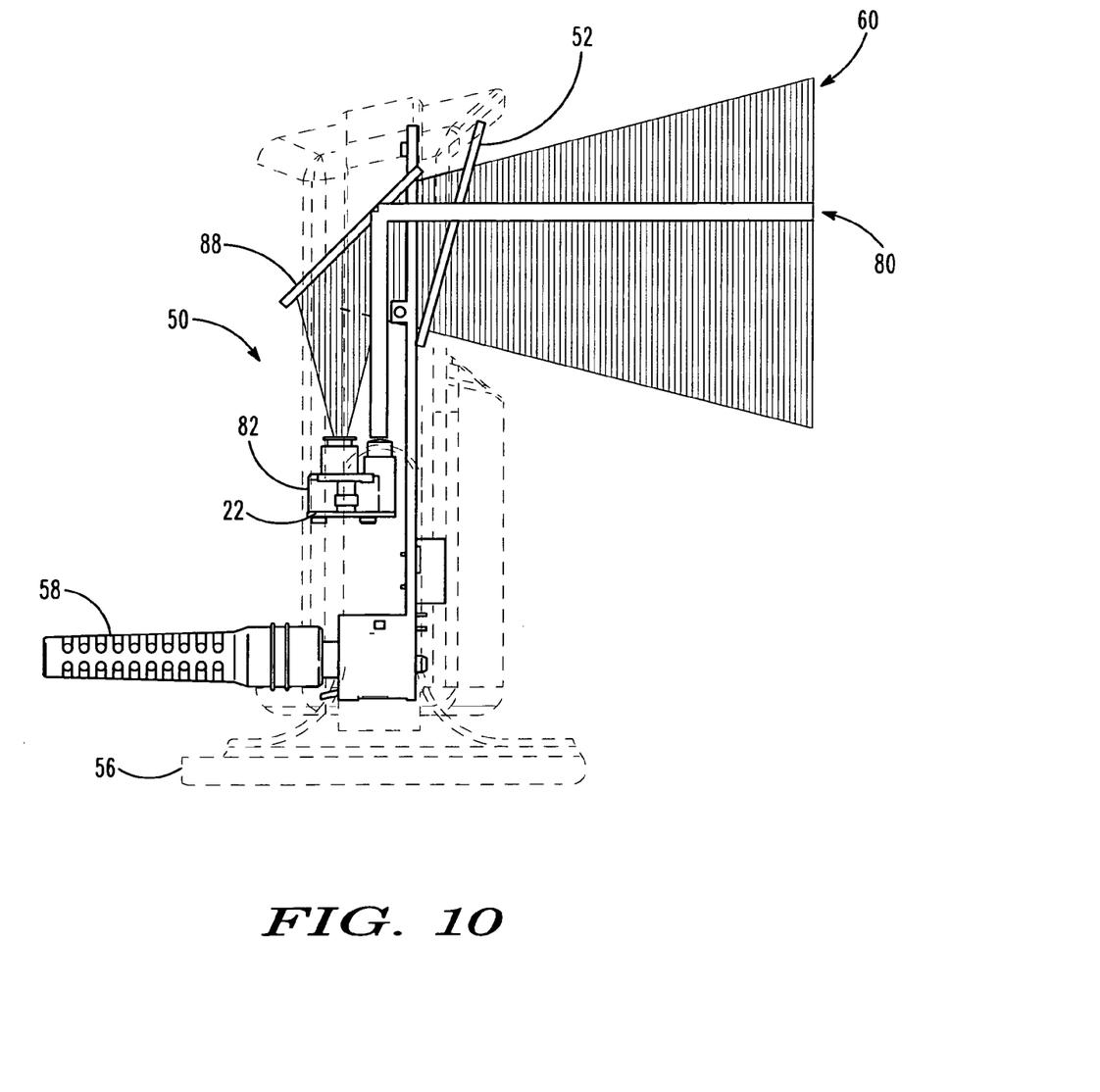
FIG. 10 is a side elevational view of the interior of another imaging reader operative in a hands-free mode for projecting light that both illuminates, and assists in aiming the reader at, a target, according to this invention.

Another way to increase the distance between the illumination light assembly and the window 52 is to use a single fold mirror 88 as depicted in FIG. 10. The imaging engine in FIG. 10 is turned 90 degrees as compared to its orientation in FIG. 9, thereby enabling one of the fold mirrors to be eliminated.

It will be understood that each of the elements described above, or two or more together, also may find a useful application in other types of constructions differing from the types described above. For example, the bezel 70 need not be a separate part, but could be part of the housing itself, or part of a rubber boot mounted at the front end region of the housing. Also, the use of a single pair of illumination LEDs, as described above, has a range of about ten inches from the window and a swipe speed of around 50 to 100 inches per second. Additional illumination LEDs, such as another pair, can be mounted on the PCB 22 to increase the working range and/or swipe speed. A single illumination LED can be mounted on the PCB 22 if such an increased working range and/or swipe speed is not desired.

While the invention has been illustrated and described as an imaging reader and method with a dual function illumination light assembly, it is not intended to be limited to the details shown, since various modifications and structural changes may be made without departing in any way from the spirit of the present invention. For example, this invention is not to be limited solely to imaging readers whose only function is to image targets, but could equally well apply to mobile computers or terminals having an imager 24 as one of its subsystems.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically imaging targets, comprising:
    a housing having a front end region having boundary walls bounding a passage;
    a solid-state imager supported by the housing, for capturing return light along an optical path through the passage over a field of view from a target during an exposure time period, and for generating an electrical signal indicative of the captured light;
    a controller supported by the housing, for processing the electrical signal into data indicative of the target being imaged;
    an illumination light assembly supported back in the housing along the optical path away from the boundary walls of the housing and operatively connected to the controller, for projecting illumination light along the optical path through the passage to illuminate the target, the boundary walls of the housing for clipping the illumination light to form on the target a two-dimensional aiming light distribution that visually indicates the entire periphery of the field of view to assist in positioning the target entirely within the field of view; and
    wherein the controller is further configured to turn on the illumination light at least during part of the exposure time period.

2. The reader of claim 1, wherein the housing is configured to be held for handheld operation.

3. The reader of claim 1, wherein the boundary walls are circumferentially complete, and circumferentially clip the illumination light to visually indicate the entire periphery of the field of view.

4. The reader of claim 1, wherein the imager is one of a charge coupled device, a complementary metal oxide silicon device, and a wafer scale device.

5. The reader of claim 1, wherein the illumination light assembly includes a pair of illumination light emitting diodes (LEDs) spaced apart from each other, and a pair of illumination lenses, one for each illumination LED, for optically modifying the illumination light as a pair of conical light beams that at least partially overlap on the target.

6. The reader of claim 5, wherein the illumination light assembly includes an aiming light emitting diode (LED) for emitting an aiming light beam, and an aiming lens for optically modifying the aiming light beam to project an aiming spot centrally on the target.

7. The reader of claim 6, and a printed circuit board on which the illumination LEDs and the imager are commonly mounted, and wherein the pair of illumination LEDs are located at opposite sides of the imager.

8. The reader of claim 7, wherein the aiming LED and the imager are commonly mounted on the printed circuit board, and wherein the aiming LED is located midway between the illumination LEDs.

9. The reader of claim 1, wherein the illumination light assembly includes an aiming light emitting diode (LED) for emitting an aiming light beam, wherein the imager detects when the target is positioned in the aiming light beam, and wherein the controller initiates the imaging in response to the target detection.

10. The reader of claim 1, and a light-transmissive window mounted in the passage and bounded by the boundary walls.

11. The reader of claim 1, wherein the housing is a box-shaped housing.

12. A reader for electro-optically imaging targets, comprising:
boundary means having boundary walls for bounding a passage in a front end region of a housing;
imaging means for capturing return light along an optical path through the passage over a field of view from a target during an exposure time period, and for generating an electrical signal indicative of the captured light;
control means for processing the electrical signal into data indicative of the target being imaged;
illumination means being located back in the housing along the optical path away from the boundary walls of the housing for projecting illumination light along the optical path through the passage to illuminate the target, the boundary walls of the housing for clipping the illumination light to form on the target a two-dimensional aiming light distribution that visually indicates the entire periphery of the field of view to assist in positioning the target entirely within the field of view; and
wherein the control means is further configured to turn on the illumination light at least during part of the exposure time period.

13. A method of electro-optically imaging targets, comprising the steps of:
bounding a passage with boundary walls of a front end region of a housing;
capturing return light from a target along an optical path through the passage over a field of view of a solid-state imager during an exposure time period, and generating an electrical signal indicative of the captured light;
processing the electrical signal into data indicative of the target being imaged;
projecting illumination light from an illumination light assembly along the optical path through the passage to illuminate the target at least during part of the exposure time period; and
spacing the illumination light assembly back in the housing along the optical path away from the boundary walls of the housing and clipping the illumination light by the boundary walls of the housing to form on the target a two-dimensional aiming light distribution that visually indicates the entire periphery of the field of view to assist in positioning the target entirely within the field of view.

14. The method of claim 13, and a step of holding the housing for handheld operation.

15. The method of claim 13, and a step of configuring the boundary walls to be circumferentially complete, and wherein the clipping step is performed by circumferentially clipping the illumination light to visually indicate the entire periphery of the field of view.

16. The reader of claim 13, and a step of configuring the imager to be one of a charge coupled device, a complementary metal oxide silicon device, and a wafer scale device.

17. The method of claim 13, wherein the projecting step is performed by optically modifying the illumination light as a pair of conical light beams that at least partially overlap on the target.

18. The method of claim 13, and a step of emitting and optically modifying an aiming light beam to project an aiming spot centrally on the target.

19. The method of claim 13, and the steps of emitting an aiming light beam, detecting when the target is positioned in the aiming light beam, and initiating the imaging in response to the target detection.

20. The method of claim 13, and a light-transmissive window mounted in the passage and bounded by the boundary walls.

21. The method of claim 13, wherein the housing is a box-shaped housing.

* * * * *